United States Patent
Yaguchi et al.

(10) Patent No.: US 8,574,455 B2
(45) Date of Patent: Nov. 5, 2013

(54) FLUORINE-CONTAINING LIQUID CRYSTAL COMPOUND, LIQUID CRYSTAL COMPOSITION, AND LIQUID CRYSTAL ELECTRO-OPTIC ELEMENT

(75) Inventors: Tomoko Yaguchi, Chigasaki (JP); Tomoyuki Asai, Chigasaki (JP); Hidemasa Koh, Chigasaki (JP)

(73) Assignee: AGC Seimi Chemical Co., Ltd., Chigasaki-shi (JP)

( * ) Notice: Subject to any disclaimer, the term of this patent is extended or adjusted under 35 U.S.C. 154(b) by 24 days.

(21) Appl. No.: 13/142,148

(22) PCT Filed: Dec. 22, 2009

(86) PCT No.: PCT/JP2009/071309
§ 371 (c)(1),
(2), (4) Date: Jun. 24, 2011

(87) PCT Pub. No.: WO2010/074071
PCT Pub. Date: Jul. 1, 2010

(65) Prior Publication Data
US 2011/0268894 A1 Nov. 3, 2011

(30) Foreign Application Priority Data
Dec. 24, 2008 (JP) ................................ 2008-328597

(51) Int. Cl.
C09K 19/30 (2006.01)
C09K 19/12 (2006.01)
C09K 19/28 (2006.01)
C09K 19/34 (2006.01)
C07C 22/08 (2006.01)

(52) U.S. Cl.
USPC ............ 252/299.63; 252/299.61; 252/299.66; 570/128

(58) Field of Classification Search
USPC ................ 570/128, 131; 252/299.61, 299.63, 252/299.66
See application file for complete search history.

(56) References Cited

U.S. PATENT DOCUMENTS

| | | | |
|---|---|---|---|
| 5,403,512 A | 4/1995 | Bartmann et al. | |
| 5,621,147 A | 4/1997 | Yokokoji et al. | |
| 5,866,035 A | 2/1999 | Sekine et al. | |
| 6,159,393 A | 12/2000 | Tarumi et al. | |
| 2005/0006624 A1 | 1/2005 | Kato | |
| 2008/0266512 A1 | 10/2008 | Campbell et al. | |
| 2009/0065739 A1* | 3/2009 | Haseba et al. | ........... 252/299.62 |

FOREIGN PATENT DOCUMENTS

| | | |
|---|---|---|
| EP | 1 053 996 A1 | 11/2000 |
| EP | 1 655 360 A1 | 5/2006 |
| JP | 6 500343 | 1/1994 |
| JP | 8 12604 | 1/1996 |
| JP | 9 278688 | 10/1997 |
| JP | 10 204435 | 8/1998 |
| JP | 2000 80366 | 3/2000 |
| JP | 2005 298466 | 10/2005 |
| JP | 2006 321804 | 11/2006 |
| JP | 2008019225 A * | 1/2008 |
| WO | 2006 011377 | 2/2006 |

OTHER PUBLICATIONS

CAPLUS 2008: 120774, 2008.*
Uhm et al, "Syntheses of Novel Liquid Crystalline Compounds with Partially Fluorinated Side Chains", Bull. Korean Chem. Soc. 2000, vol. 21, No. 4, 441-445.*
International Search Report issued Mar. 9, 2010 in PCT/JP09/071309 filed Dec. 22, 2009.
U.S. Appl. No. 13/098,928, filed May 2, 2011, Kawamata, et al.
U.S. Appl. No. 13/098,901, filed May 2, 2011, Kawamata, et al.
Extended European Search Report Issued Oct. 5, 2012 in Patent Application No. 09834872.5.
Takashi Kato et al., "Liquid crystalline perfluroazomethines and perfluoroprooenes exhibiting large dielectric anisotropies", Liquid Crystals, vol. 33, No. 5, XP-001241824, May 2006, pp. 543-548.

* cited by examiner

*Primary Examiner* — Shean C Wu
(74) *Attorney, Agent, or Firm* — Oblon, Spivak, McClelland, Maier & Neustadt, L.L.P.

(57) ABSTRACT

A liquid crystal compound, a liquid crystal composition, and a liquid crystal electric optical device having a low rotational viscosity ($\gamma 1$) and appropriate elastic constants. A fluorine-containing liquid crystal compound represented by formula (1). $R^1-(A^1-Z^1)a-(A^2-Z^2)b-(A^3-Z^3)c-A^4-(CH_2)n-CF=CF-R^2$ (1), $R^1$ is a hydrogen atom, a halogen atom, or an alkyl group, $R^2$ is a halogen atom or an alkyl group that may be halogen-substituted or which may include a (thio)ether group, $A^1$ to $A^4$ may be a phenylene group or a cyclohexylene group that may be halogen-substituted or which may include a (thio)ether group, $Z^1$ to $Z^3$ are a single bond, —O—, —S—, or a divalent aliphatic hydrocarbon group that may be halogen-substituted or which may include a (thio)ether group. n is an integer from 0 to 3, and a, b, and c are 0 or 1, provided that a+b+c is 1 or greater.

7 Claims, No Drawings

FLUORINE-CONTAINING LIQUID CRYSTAL COMPOUND, LIQUID CRYSTAL COMPOSITION, AND LIQUID CRYSTAL ELECTRO-OPTIC ELEMENT

TECHNICAL FIELD

The present invention relates to a fluorine-containing liquid crystal compound having liquid crystallinity, a liquid crystal composition containing the same, and a liquid crystal electric optical device.

BACKGROUND ART

Liquid crystal electric optical devices are used in a wide variety of products including portable equipment such as mobile telephones and PDAs; display units of office automation equipment such as photocopiers and monitors of personal computers; display units of home electric appliances such as liquid crystal televisions; and other products exemplified by watches, desktop calculators, measuring instruments, meters used in automobiles, and cameras, and are required to have various performances including a broad range of operating temperature, a low operating voltage, a high-speed response, and a chemical stability.

Such liquid crystal electric optical devices comprise constituent materials exhibiting a liquid crystal phase. Presently, however, not all of these properties are provided by a single compound and, therefore, a plurality of liquid crystal compounds and non-liquid crystalline compounds each excelling in one or more properties are mixed to meet the performances a liquid crystal compound is required to have.

It is a critical issue to provide a liquid crystal compound highly compatible with other liquid crystal materials or non-liquid crystal materials, chemically stable, and, when used in a liquid crystal electric optical device, capable of a high-speed response in a broad temperature range, and operable at a low voltage among various properties required of compounds used in a liquid crystal optical composition in the field of liquid crystal electric optical devices.

Particularly in recent years, a high response speed, i.e., improvement in response speed of liquid crystal electric optical devices are required in many applications while improving or maintaining other conditions at the same time: low-voltage operation and high speed response in battery-operated applications; high-definition display and high speed response in office automation equipment; and a broad range of operating temperature and high speed response at a low temperature in automobile meters. Such improvements are particularly important given the tendency of liquid crystals to exhibit a lower response speed as the temperature decreases.

Reducing the viscosity of a liquid crystal composition is one of the ways to improve the response speed. When the viscosity of a liquid crystal composition decreases, its response speed typically improves, and hence its response at a low temperature also improves. However, there have been no useful liquid crystal compositions thus far available with a sufficiently low viscosity. In addition to possessing such physical properties, a compound used in a liquid crystal composition is also required to excel in compatibility with another liquid crystal compound and/or non-liquid crystal compound, be a chemically stable compound, and achieve a low threshold voltage when used in a composition. To improve the response speed and achieve a low threshold voltage, selectively using liquid crystal compounds each having an appropriate elastic constant is of critical importance.

As a solution to such issue, a difluorostyrene derivative represented by formula I, for example, is considered (see Patent Document 1). However, the compound specifically described therein poses a problem that a fluorovinyl group is located adjacent a part of a conjugated system, which is liable to cause chemical instability.

[Chemical Formula 1]

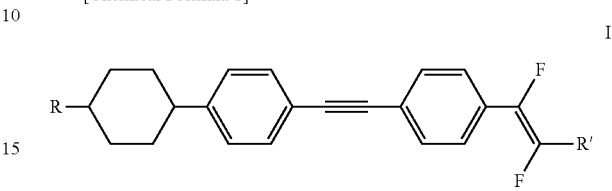

On the other hand, a derivative represented by a following formula II (see Patent Document 2) or a compound having a structure Y-A-Cy-CF=CF$_2$ (Cy:trans-1,4-cyclohexylene group, A:saturated or unsaturated ring group, Y:hydrogen atom, R or RO) (see Patent Document 3) are considered as a compound having a similar structure to that of the liquid crystal compound of the invention and of which the nematic phase exhibits a broad range of appearance temperature. However, specific liquid crystal compounds described in these documents had problems such that some of them have a univariable nematic phase and that their liquid crystal temperature range is small.

[Chemical Formula 2]

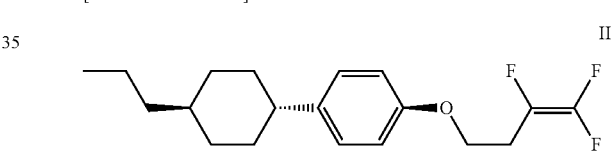

PATENT DOCUMENTS

Patent Document 1: JP 10-204435 A;
Patent Document 2: WO06/011377
Patent Document 3: JP 2000-80366 A

DISCLOSURE OF THE INVENTION

Problems to be Solved by the Invention

An object of the present invention is to provide a fluorine-containing liquid crystal compound having a low rotational viscosity ($\gamma 1$) and appropriate elastic constants ($K_{11}$, $K_{33}$).

Another object of the present invention is to provide a liquid crystal composition comprising the fluorine-containing liquid crystal compound, possessing a sufficiently low viscosity, and having a low threshold voltage, and a liquid crystal electric optical device using the liquid crystal composition and exhibiting a high-speed response.

Means to Solve the Problems

A thorough study made by the present inventors has led to providing a novel fluorine-containing liquid crystal compound having a low rotational viscosity ($\gamma 1$) and appropriate elastic constants ($K_{11}$, $K_{33}$) by introducing a fluoroalkenyl group having a specific structure shown below.

The fluorine-containing liquid crystal compound represented by formula (1) is expressed herein as compound (1), and the other compounds represented by other formulae are likewise expressed.

To achieve the above objects, the present invention provides the compound (1).

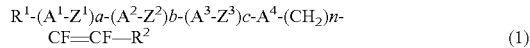
(1)

[The signs used in formula (1) respectively denote the following:

$R^1$ is a hydrogen atom, a halogen atom, or an alkyl group having 1 to 10 carbons.

$R^2$ is a halogen atom or an alkyl group having 1 to 10 carbons. One or more hydrogen atoms in the alkyl group in $R^1$ and $R^2$ may be substituted with a halogen atom, and an ethereal oxygen atom or a thioethereal sulfur atom may be inserted between carbon-carbon atoms in the alkyl group or at the bond end of the alkyl group.

$A^1$, $A^2$, $A^3$ and $A^4$ independently represent a phenyl group or a cyclohexylene group. One or more hydrogen atoms in the groups of $A^1$, $A^2$, $A^3$ and $A^4$ may be substituted with a halogen atom; one or two —CH= in these groups may be substituted with a nitrogen atom; and one or two —CH$_2$— in these groups may be substituted with an ethereal oxygen atom or a thioethereal sulfur atom.

$Z^1$, $Z^2$ and $Z^3$ independently represent a single bond, —O—, —S—, or a divalent aliphatic hydrocarbon group having 1 to 4 carbons. One or more hydrogen atoms in the aliphatic hydrocarbon group may be substituted with a halogen atom, and an ethereal oxygen atom or a thioethereal sulfur atom may be inserted between carbon-carbon atoms in the aliphatic hydrocarbon group or at the bonding end of the aliphatic hydrocarbon group.

a, b, c independently represent 0 or 1. a+b+c is 1 or greater.

n is an integer from 0 to 3. When $A^4$ is a phenylene group, n is 1, 2, or 3. When $A^4$ is a cyclohexylene group and n=0, $R^2$ is an alkyl group having 1 to 10 carbons.

Preferably, in the compound (1), $R^1$ is a fluorine atom, an alkyl group, an alkoxy group, a fluoroalkyl group or a fluoroalkoxy group having 1 to 5 atoms, and $R^2$ is a fluorine atom or an alkyl group having 1 to 5 atoms.

Preferably, in the compound (1), $A^1$, $A^2$, $A^3$ and $A^4$ independently represent a 1,4-cyclohexylene group or a 1,4-phenylene group. One or more hydrogen atoms in the 1,4-phenylene group may be substituted with a fluorine atom.

In the compound (1), n is preferably 0 or 2.

Preferably, in the compound (1), n is 2, and $R^2$ is a fluorine atom or an alkyl group having 1 to 5 carbons.

In the compound (1), a+b+c is preferably 2 or less.

Further, the present invention provides a liquid crystal composition containing the liquid crystal compound (1).

The present invention further provides a liquid crystal electric optical device wherein a liquid crystal composition containing the liquid crystal compound (1) is held between substrates provided with electrodes.

Effects of the Invention

The fluorine-containing liquid crystal compound of the invention has a low rotational viscosity (γ1) and appropriate elastic constants ($K_{11}$, $K_{33}$). Further, the fluorine-containing liquid crystal compound of the invention has an excellent compatibility with other liquid crystalline compounds or non-liquid crystal compounds and is chemically stable. Further still, by letting n be 2, the fluorine-containing liquid crystal compound of the invention has a wider liquid crystal temperature range and a higher clearing point (Tc) than other compounds having a similar structure.

Further, the liquid crystal composition containing the liquid crystal compound of the invention has a low viscosity and a low threshold voltage.

Still further, the liquid crystal composition of the invention may be used to obtain a liquid crystal electric optical device having an excellent response.

BEST MODE FOR CARRYING OUT THE INVENTION

In the compound (1), $R^1$ and $R^2$ represent the same as above. Substitution with a halogen atom and insertion of an ethereal oxygen atom or a thioethereal sulfur atom may be effected simultaneously in the same alkyl group.

Examples of the groups where one or more hydrogen atoms in a monovalent alkyl group having 1 to 10 carbons are substituted with halogen atoms include a fluoroalkyl group and a chloroalkyl group. Examples of the groups where an ethereal oxygen atom or a thioethereal sulfur atom is inserted between carbon-carbon atoms of these groups include a alkoxyalcol group and an alkylthioalkyl group. Examples of the groups where an ethereal oxygen atom or a thioethereal sulfur atom is inserted at the bond end of these groups include an alkoxy group and an alkylthio group. Examples of the groups where substitution with a halogen atom and insertion of an ethereal oxygen atom or a thioethereal sulfur atom are effected simultaneously in the same alkyl group include a fluoroalkoxy group. These groups may be linear or branched and preferably linear.

Examples of the alkyl group having 1 to 10 carbon atoms that may be preferably used include an alkyl group having 1 to 5 carbons and more preferably a methyl group, a propyl group and a pentyl group. Examples of the alkoxy group having 1 to 10 carbon atoms that may be preferably used include an alkoxy group having 1 to 5 carbons and more preferably an ethoxy group and a butoxy group. Examples of the fluoroalkyl group having 1 to 10 carbon atoms that may be preferably used include a fluoroalkyl group having 1 to 5 carbons and more preferably a trifluoromethyl group. Examples of the fluoroalkoxy group having 1 to 10 carbon atoms that may be preferably used include a fluoroalkoxy group having 1 to 5 carbons and more preferably a trifluoromethoxy group. Examples of the halogen atom that may be preferably used include a fluorine atom or a chlorine atom and preferably a fluorine atom.

$R^1$ is preferably a halogen atom or an alkyl group having 1 to 10 carbons. One or more hydrogen atoms in the alkyl group may be substituted with a fluorine atom, and an ethereal oxygen atom or a thioethereal sulfur atom may be inserted between carbon-carbon atoms in the group or at the bond end of the group.

Specifically, $R^1$ is preferably a fluorine atom or an alkyl group, an alkoxy group, a fluoroalkyl group, or a fluoroalkoxy group, all linear and having 1 to 10 carbons. More preferably, $R^1$ is a fluorine atom or an alkyl group, an alkoxy group, a fluoroalkyl group, or a fluoroalkoxy group, all linear and having 1 to 5 carbons.

$R^2$ is preferably a fluorine atom or a linear alkyl group having 1 to 10 carbons. $R^2$ is more preferably a fluorine atom or a linear alkyl group having 1 to 5 carbons.

In the compound (1), $A^1$, $A^2$, $A^3$ and $A^4$ represent the same as above.

$A^1, A^2, A^3$ and $A^4$ are preferably a 1,4-cyclohexylene group or a 1,4-phenylene group, because both allow the compound to have a linear structure, which is easy to use in liquid crystal-related applications. From a viewpoint of compatibility and dielectric anisotropy in use for liquid crystal-related applications, it is also preferable that the 1,4-phenylene group is substituted with one or more fluorine atoms. The 1,4-phenylene group substituted with one or more fluorine atoms is preferably a 3-fluoro-1,4-phenylene group, a 3,5-difluoro-1,4-phenylene group, or a 2,3-difluoro-1,4-phenylene group.

$Z^1, Z^2$ and $^3$ represent the same as above. Substitution with a halogen atom and insertion of an ethereal oxygen atom or a thioethereal sulfur atom may be effected simultaneously in the same aliphatic hydrocarbon group.

When $Z^1$ is a single bond, the ring groups on both sides of $Z^1$ bond directly. For example, when $Z^1$ is a single bond and b is 0, $A^1$ and $A^3$ bond directly. When $Z^1$ is a single bond and b is 1, $A^1$ and $A^2$ bond directly. The same applies to $Z^2$ and $Z^3$.

The divalent aliphatic hydrocarbon group is exemplified by an alkylene group having 1 to 4 carbons, an alkenylene group having 2 to 4 carbons, and an alkynylene group having 2 to 4 carbons. The group wherein the hydrogen atoms in these groups are substituted with a halogen atom is exemplified by a fluoroalkylene group, a chloroalkylene group, and a fluoroalkenylene group. The group wherein an ethereal oxygen atom or a thioethereal sulfur atom is inserted between carbon-carbon atoms in these groups or at the bond end of the group is exemplified by an oxyalkylene group, an alkyloxyalkylene group, a thioalkylene group, an oxyfluoroalkylene group, and a thiofluoroalkylene group.

The alkylene group is exemplified by —CH$_2$—, —CH$_2$CH$_2$—, —CH$_2$CH$_2$CH$_2$—, and —CH$_2$CH$_2$CH$_2$CH$_2$—, and is preferably —CH$_2$— or —CH$_2$CH$_2$—.

The alkenylene group is exemplified by —CH═CH—, —CH═CH—CH$_2$—, —CH═CH—CH$_2$—CH$_2$—, —CH═CH—CH═CH—, and —CH$_2$—CH═CH—CH$_2$—, and is preferably —CH═CH—.

The alkynylene group is exemplified by —C≡C—, —C≡C—CH$_2$—, —C≡C—CH$_2$—CH$_2$—, —C≡C—C≡C—, and —CH$_2$—C≡C—CH$_2$—, and is preferably —C≡C—. A double bond and a triple bond may be mixedly included as in —CH═CH—C≡C—.

The fluoroalkylene group, the chloroalkylene group, and the fluoroalkenylene group are exemplified by —CF$_2$—, —CF$_2$CF$_2$—, —CF$_2$CF$_2$CF$_2$CF$_2$—, —CH$_2$CF$_2$—, —CF═CF—, —CCl$_2$CH$_2$—, and —CF═CF—C≡C—, and are preferably —CF$_2$CF$_2$— or —CF═CF—.

The oxyalkylene group, the thioalkylene group, the alkyloxyalkylene group, the oxyfluoroalkylene group, and the thiofluoroalkylene group are exemplified by —OCH$_2$—, —CH$_2$O—, —SCH$_2$—, —CH$_2$S—, —CH$_2$CH$_2$OCH$_2$—, —OCF$_2$—, —SCF$_2$—, —CF$_2$O—, and —CF$_2$S— and are preferably —OCF$_2$— or —CF$_2$O—.

When $Z^1, Z^2$, and $Z^3$ bond with a phenylene group, they preferably do not have an unsaturated bond such as a double bond where they bond from a viewpoint of stability of the compound.

From a veiwpoint of stability of the compound and ease of synthesis, $Z^1, Z^2$, and $Z^3$ are preferably a single bond, —O—, —S—, or an alkylene group having 1 to 4 carbons. One or more hydrogen atoms in the alkylene group may be substituted with a fluorine atom, and an ethereal oxygen atom or a thioethereal sulfur atom may be inserted between carbon-carbon atoms or at the bond end of the alkylene group. $Z^1, Z^2$, and $Z^3$ are preferably a single bond or an alkylene group having 1 to 4 carbons and more preferably a single bond.

In the liquid crystal compound (1), n is an integer from 0 to 3. For the viscosity to be low, n is preferably 0 or 2.

In the liquid crystal compound (1), preferably n is 2, and $R^2$ is a fluorine atom or an alkyl group having 1 to 5 carbons and more preferably n is 2, and $R^2$ is a fluorine atom.

In the liquid crystal compound (1), a, b, and c independently represent 0 or 1. Preferably, a+b+c is 1 or greater and 2 or smaller.

The liquid crystal compound (1) is preferably a compound represented by a formula (1-1) below.

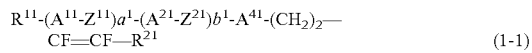

$$R^{11}\text{-}(A^{11}\text{-}Z^{11})a^1\text{-}(A^{21}\text{-}Z^{21})b^1\text{-}A^{41}\text{-}(CH_2)_2\text{---}CF\text{=}CF\text{---}R^{21} \quad (1\text{-}1)$$

[The signs used in the above formula denote the following:
$R^{11}$ is a fluorine atom, or an alkyl group, an alkoxy group, a fluoroalkyl group, or a fluoroalkoxy group having 1 to 5 carbons.
$R^{21}$ is a fluorine atom or an alkyl group having 1 to 5 carbons.
$A^{11}, A^{21}$ and $A^{41}$ independently represent a phenylene group or a cyclohexylene group. The phenylene group may be substituted with a fluorine atom.
$Z^{11}$ and $Z^{21}$ independently represent a single bond or an alkylene group having 1 to 4 carbons.
$a^1$ and $b^1$ independently represent 0 or 1. $a^1+b^1$ is 1 or greater.

Preferred examples of the liquid crystal compound (1-1) are given below.

$$C_3H_7\text{-Cy-Cy-}CH_2CH_2\text{---}CF\text{=}CF_2 \quad (1a\text{-}2\text{-}1)$$

$$C_3H_7\text{-Cy-Cy-}CH_2CH_2\text{---}CF\text{=}CF\text{---}CH_3 \quad (1b\text{-}2\text{-}1)$$

$$C_3H_7\text{-Cy-Ph-}CH_2CH_2\text{---}CF\text{=}CF_2 \quad (1c\text{-}2\text{-}1)$$

$$C_3H_7\text{-Cy-Ph-}CH_2CH_2\text{---}CF\text{=}CF\text{---}CH_3 \quad (1d\text{-}2\text{-}1)$$

$$CH_3\text{-Ph-Ph-}CH_2CH_2\text{---}CF\text{=}CF_2 \quad (1c\text{-}2\text{-}2)$$

The liquid crystal compound (1) of the present invention may be synthesized by a method described below.

When the liquid crystal compound (1) to be obtained is a compound where $R^2$ is a fluorine atom (compound (1α)), the compound (1α) may be obtained by metallating a compound (2), followed by reaction with tetrafluoroethylene as shown by the reaction formulae below. When a compound where $R^2$ is an alkyl group (compound (1β)) is to be obtained, the compound (1β) may be obtained by causing the compound (1α) to react with a metallated product of the compound (3).

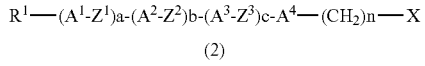

$$R^1\text{---}(A^1\text{-}Z^1)a\text{-}(A^2\text{-}Z^2)b\text{-}(A^3\text{-}Z^3)c\text{-}A^4\text{---}(CH_2)n\text{---}X$$
$$(2)$$

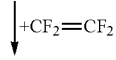

$$\downarrow +CF_2\text{=}CF_2$$

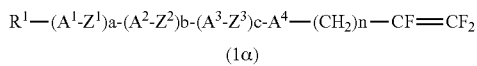

$$R^1\text{---}(A^1\text{-}Z^1)a\text{-}(A^2\text{-}Z^2)b\text{-}(A^3\text{-}Z^3)c\text{-}A^4\text{---}(CH_2)n\text{---}CF\text{=}CF_2$$
$$(1\alpha)$$

$$\downarrow +R^{2'}X$$
$$(3)$$

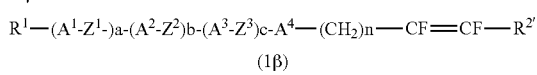

$$R^1\text{---}(A^1\text{-}Z^1\text{-})a\text{-}(A^2\text{-}Z^2)b\text{-}(A^3\text{-}Z^3)c\text{-}A^4\text{---}(CH_2)n\text{---}CF\text{=}CF\text{---}R^{2'}$$
$$(1\beta)$$

In the compound (2), the compound (3), the compound (1α), and the compound (1β), the definitions and preferred modes of $R^1$, $R^2$, $A^1$, $A^2$, $A^3$, $A^4$, $Z^1$, $Z^2$, $Z^3$, $Z^4$, a, b, c and n are the same as in the above liquid crystal compound (1). As for $R^{2'}$ in the formulae (3) and (1β), the same definitions apply as in the case where $R^2$ in the formula (1) is an alkyl group having 1 to 10 carbons.

When $R^2$ is a halogen atom other than a fluorine atom, such as a chlorine atom, the compound (1) may be obtained by first metallating the compound (2), and then allowing it to react with chlorotrifluoroethylene ($CF_2$=CFCl) in lieu of with tetrafluoroethylene.

Metallation of the compound (2) and the compound (3) may be achieved by lithiation using, for example, metallic lithium or by means of reaction with metallic magnesium to prepare a Grignard reagent.

When lithiation of the compound (2) and the compound (3) is effected using metallic lithium, an electron transfer agent may be allowed to coexist. An electron transfer agent used for that purpose may be a compound having two or more aromatic rings or a condensed-ring compound. Examples thereof include naphthalene, biphenyl, 2,6-di-tert-butyl naphthalene, 2,7-di-tert-butyl naphthalene, 4,4'-di-tert-butyl biphenyl, and anthracene, among which naphthalene, biphenyl and, among them, 4,4'-di-tert-butyl biphenyl are preferred. The electron transfer agent is used in an amount of 0.01 to 4 times the molar amount of the compound (2) or the compound (3), preferably 0.1 to 2.5 times the molar amount. When n is another integer than 0, such as 2, for example, the reaction progresses relatively easily even without the coexistence of the electron transfer agent. This is preferable in view of the ease of purification of a product.

The metallic lithium for lithiation is used in an amount of 2 to 5 times the molar amount of the compound (2) or the compound (3), preferably 2 to 3 times the molar amount.

When preparing a Grignard reagent from the compound (2) and the compound (3) by reaction thereof with metallic magnesium, the metallic magnesium is used in an amount 1 to 5 times the molar amount, preferably 1 to 1.5 times the molar amount.

Metallation of the compound (2) and the compound (3) is effected in a solvent. The solvent for the reaction may be an aromatic hydrocarbon based solvent such as benzene, toluene, xylene, and ethyl benzene; an aliphatic hydrocarbon based solvent such as pentane, hexane, heptane, and octane; an ether based solvent such as tetrahydrofuran, diethyl ether, dibutyl ether, and t-butyl methyl ether; petroleum ethers; an appropriate mixture of these solvents; or the like; a particularly preferred solvent being an ether based solvent or a mixture of an ether based solvent and an aliphatic hydrocarbon based solvent. The amount of the solvent greatly varies with the synthesis amount and may be varied as appropriate. For example, on a laboratory scale, the solvent is preferably used in a volume (mL) that is 0.1 to 10000 times and more preferably in a volume (mL) 0.5 to 3000 times with respect to 1 mol of the compound (2) or the compound (3).

The reaction temperature for metallation of the compound (2) and the compound (3) is preferably −100° C. to 100° C. and particularly −80° C. to 70° C.

The reaction time for metallation of the compound (2) and the compound (3) is preferably 0.5 hours to 48 hours and particularly 0.5 hours to 8 hours.

The compound (1α) may be obtained by effecting continuous reaction, without isolation, with tetrafluoroethylene after metallation. In other words, the reaction is effected by introducing tetrafluoroethylene in a metallated reaction liquid. Tetrafluoroethylene is used in an amount that is 1 to 10 times the molar amount of the compound (2), preferably 1 to 3 times the molar amount. As desired, tetrafluoroethylene may be diluted with inert gas such as nitrogen and argon. Dilution ratio of tetrafluoroethylene may be determined as desired and is preferably 30 volume % to 70 volume % from a viewpoint of safety and efficiency.

In the reaction between the metallated product of the compound (2) and tetrafluoroethylene, the temperature for reaction between a lithiated product and tetrafluoroethylene is preferably −100° C. to 25° C. and particularly −80° C. to 0° C. The temperature for reaction between a Grignard reagent and tetrafluoroethylene is preferably −100° C. to 80° C. and particularly 0° C. to 50° C.

In the reaction between the metallated product of the compound (2) and tetrafluoroethylene, the reaction time is 0.5 hours to 48 hours and particularly 0.5 hours to 24 hours.

After the reaction, normal after-treatment and purification are effected to obtain the compound (1α).

The compound (1β) is obtained by causing the compound (1α) and the metallated product of the compound (3) to react with each other. As described above, the separately prepared metallation reaction liquid of the compound (3) may be added with the compound (1α), or the compound (1α) may be added with the separately prepared metallation reaction liquid of the compound (3).

The compound (1α) may be previously diluted with a solvent. The diluting solvent may be an aromatic hydrocarbon based solvent such as benzene, toluene, xylene, and ethyl benzene; an aliphatic hydrocarbon based solvent such as pentane, hexane, heptane, and octane; an ether based solution such as tetrahydrofuran, diethyl ether, dibutyl ether, and t-butyl methyl ether; petroleum ethers; an appropriate mixture of these solvents; or the like, a particularly preferred solvent being an ether based solvent or a mixture of an ether based solvent and an aliphatic hydrocarbon based solvent. The amount of the diluting solvent greatly varies with the synthesis amount and may be varied as appropriate. For example, on a laboratory scale, the solvent is preferably used in a volume (mL) that is 0.1 to 2000 times with respect to 1 mol of the compound (1α), and more preferably in a volume (mL) that is 0.5 to 1000 times.

The reaction temperature is preferably −100° C. to 100° C. and particularly −80° C. to 25° C. for a lithiated product of the compound (3) and, 0° C. to 70° C. for a Grignard reagent of the compound (3).

The reaction time is preferably 0.5 hours to 48 hours and particularly 0.5 hours to 24 hours.

After the reaction, normal after-treatment and purification are effected to obtain a novel fluorine-containing compound represented by the compound (1).

The compound (2), for example the compound (2-1), may be obtained by a known method whereby, for example, a compound (5) described below is reduced to produce a compound (6), which is then halogenated to achieve synthesis. In the compound (5), a compound (6), and a compound (2-1), the definitions and preferred modes of $R^1$, $R^2$, $A^1$, $A^2$, $A^3$, $A^4$, $Z^1$, $Z^2$, $Z^3$, $Z^4$, a, b, and c are the same as in the above compound (1).

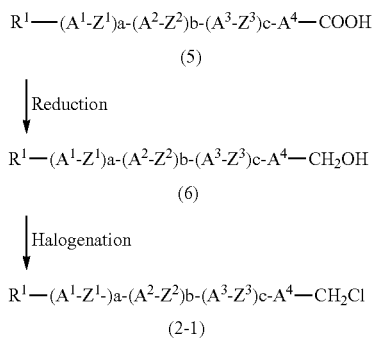

The fluorine-containing liquid crystal compound (1) of the invention enables production of a liquid crystal composition having an excellent performance when at least one kind thereof is mixed with another liquid crystal compound and/or non-liquid crystal compound. For example, when a conventional liquid crystal composition is added with the fluorine-containing liquid crystal compound of the invention, such effects as reduction of viscosity and optimization of elastic constants may be expected.

The fluorine-containing liquid crystal compound (1) of the invention is usually not used alone in a liquid crystal electric optical device but used with another liquid crystal compound to produce a mixture, i.e., a liquid crystal composition, which is used in a liquid crystal electric optical device and the like. Because the fluorine-containing liquid crystal compound (1) used as a constituent of a liquid crystal composition has a low rotational viscosity, addition of the fluorine-containing liquid crystal compound (1) of the invention reduces the rotational viscosity ($\gamma 1$) of the liquid crystal composition and hence improves the response of a liquid crystal electric optical device using the liquid crystal composition.

Further, the fluorine-containing liquid crystal compound (1) of the invention excels in compatibility with another liquid crystal compound and/or non-liquid crystalline compound and is not limited, given its chemical stability, in the kinds of other liquid crystal compounds with which it may be used, thus enabling application to a wide variety of liquid crystal compositions according to the purposes.

The fluorine-containing liquid crystal compound (1) of the invention is not specifically limited in use and, given its excellent properties, particularly useful when used in applications where the fluorine-containing liquid crystal compound is used as one constituent of a liquid crystal composition employed in liquid crystal electric optical devices, particularly liquid crystal display devices.

Next, the liquid crystal composition of the invention will be described.

The liquid crystal composition of the invention comprises 1 mass % or more of the fluorine-containing liquid crystal compound of the invention and 60 mass % or more of another liquid crystal compound. Two or more kinds of other liquid crystal compounds may be contained. When the liquid crystal composition comprises the fluorine-containing liquid crystal compound of the invention in an amount less than the above range, the fluorine-containing liquid crystal compound of the invention may not be able to fully exhibit its characteristics.

The liquid crystal composition of the invention may comprise a non-liquid crystalline compound besides these liquid crystal compounds.

The non-liquid crystalline compound is exemplified by a chiral reagent, a pigment, a stabilizer, and other various functional compounds included in a liquid crystal composition. Among chiral reagents, pigments, and the like that may be used are compounds having a liquid crystallinity. For the purpose of the invention, such functional compounds as having a liquid crystallinity are classified into a liquid crystal.

Liquid crystal compositions used for liquid crystal electric optical devices (particularly for liquid crystal display devices) typically comprise a mixture of various liquid crystal compounds. Liquid crystal compositions used for such applications often comprise five or more kinds of liquid crystal compounds (most often ten or more kinds). There are few cases where the ratio of one kind of liquid crystal compound contained in a liquid crystal composition to all the liquid crystal compounds exceeds 50 mass %, and the ratio is typically 30 mass % or less. Therefore, the ratios of the individual liquid crystal compounds contained in a liquid crystal composition is 1 to 25 mass % in most of the cases. A kind of liquid crystal compound may be contained in a liquid crystal composition at a ratio of less than 1 mass % (normally 0.1 mass % or more), but there still exists technological significance in such crystal compound being contained in a liquid crystal composition albeit small in amount. Such liquid crystal compositions used for applications as described above often contain a chiral reagent, in which case, its content ratio is typically 10 mass % or less and particularly 5 mass % or less.

The liquid crystal compound of the present invention is not limited to a compound exhibiting a liquid crystallinity at room temperature as an independent compound and may be a compound that exhibits a liquid crystallinity in a liquid crystal composition at an operating temperature thereof when the liquid crystal composition is used in a given application. For example, the liquid crystal compound may be a compound that is solid at room temperature as an independent compound and, when dissolved in a liquid crystal composition, exhibits a liquid crystallinity at the operating temperature.

Considering the above, the liquid crystal composition of the invention preferably contains 1 to 30 mass % of the fluorine-containing liquid crystal compound of the invention and 60 mass % or more of another liquid crystal compound and more preferably 1 to 25 mass % of the fluorine-containing liquid crystal compound of the invention and 70 mass % or more of another liquid crystal compound. The content ratio of another liquid crystal compound is preferably 99 mass % or less.

The content ratio of the total amount of the fluorine-containing liquid crystal compound of the invention and another liquid crystal compound to the whole liquid crystal composition is preferably 90 mass % or more and particularly 95 mass % or more.

Note that when the fluorine-containing liquid crystal composition of the invention contains two or more kinds of the fluorine-containing liquid crystal compound of the invention, the ratio of the fluorine-containing liquid crystal compound of the invention represents the ratio of the total amount of such two or more kinds of the liquid crystal compound of the invention.

The kinds of another liquid crystal compound in the liquid crystal composition of the invention are not limited. A liquid crystal compound of any kind may be selected according to the purpose and used with the fluorine-containing liquid crystal compound of the invention to produce the liquid crystal composition. A functional compound such as a chiral reagent may be added as necessary. Further, the fluorine-containing liquid crystal compound of the invention may be added to an existing liquid crystal composition (e.g., a commercially available liquid crystal composition) to produce the liquid crystal composition of the invention. The liquid crystal composition of the invention may be produced by any method as appropriate and may be produced, for example, by mixing the above ingredients with an agitator and the like.

Another liquid crystal compound constituting the liquid crystal composition of the invention is preferably selected from the following liquid crystal compounds, which are publicly known or widely known as liquid crystal compound. Another liquid crystal compound in the liquid crystal composition of the invention is not limited to these compounds below.

$R^3$-Cy-Cy-$R^4$
$R^3$-Cy-Ph-$R^4$
$R^3$-Ph-Ph-$R^4$
$R^3$-Ph-C≡C-Ph-$R^4$
$R^3$-Cy-COO-Ph-$R^4$
$R^3$-Ph-COO-Ph-$R^4$
$R^3$-Cy-CH=CH-Ph-$R^4$
$R^3$-Cy-CH$_2$CH$_2$-Ph-$R^4$
$R^3$-Ph-CH$_2$CH$_2$-Ph-$R^4$
$R^3$-Cy-Cy-Ph-$R^4$
$R^3$-Cy-Ph-Ph-$R^4$
$R^3$-Cy-Ph-C≡C-Ph-$R^4$
$R^3$-Ph-Ph-Ph-$R^4$
$R^3$-Cy-Ph-Ph-Cy-$R^4$
$R^3$-Ph-Ph-C≡C-Ph-$R^4$
$R^3$-Cy-COO-Ph-Ph-$R^4$
$R^3$-Cy-Ph-COO-Ph-$R^4$
$R^3$-Cy-COO-Ph-COO-Ph-$R^4$
$R^3$-Ph-COO-Ph-COO-Ph-$R^4$
$R^3$-Ph-COO-Ph-OCO-Ph-$R^4$

In the above formulae, $R^3$ and $^4$ represent alkyl group, alkenyl group, alkynyl group, alkoxy group, halogen atom, or cyano group. $R^3$ and $R^4$ may be the same or different. Cy represents a 1,4-cyclohexylene group; Ph represents a 1,4-phenylene group where one or more hydrogen atoms may be substituted with a fluorine atom.

These compounds are given by way of example, and may be compounds wherein hydrogen atoms in ring structures and end groups are substituted with, for example, a halogen atom, a cyano group, and a methyl group. These compounds may be compounds wherein a ring group Cy and a ring group Ph are substituted with a pyrimidine ring, a dioxane ring, and the like. These compounds may be compounds wherein the linking group between ring groups are altered to, for example, —CH$_2$O—, —CH=CH—, —N=N—, —CH=N—, —COOCH$_2$—, —OCOCH$_2$—, or —COCH$_2$—. Selection thereof may be made according to the performance desired.

Next, the liquid crystal electric optical device of the invention will be described.

The present invention provides a liquid crystal electric optical device that may be suitably used as a constituent material having a liquid crystal phase.

The liquid crystal electric optical device of the present invention comprises the liquid crystal composition of the invention held between substrates provided with electrodes.

The liquid crystal electric optical device of the invention is not specifically limited except that it uses the liquid crystal composition of the invention and may have the configuration of a typical liquid crystal electric optical device.

The liquid crystal electric optical device of the invention is exemplified by, for example, a liquid crystal electric optical device comprising an electric optical device portion configured by sandwiching a liquid phase, which is formed by, for example, injecting the liquid crystal composition of the invention into a liquid crystal cell, between two substrates each provided with an electrode. Such liquid crystal electric optical device is of a type that may be operated in various modes, including TN type, STN type, guest-host (GH) type, dynamical scattering type, phase change type, DAP type, dual frequency-driven type, and high dielectric liquid crystal display type.

Given below are examples of the configuration of the liquid crystal electric optical device and the method of producing the same. Substrates made of, for example, plastic or glass are each formed, as necessary, with an undercoat or a color filter layer of, for example, $SiO_2$ or $Al_2O_3$, and each provided with an electrode of, for example, $In_2O_3$—$SnO_2$(ITO) or $SnO_2$, whereupon patterning is effected, followed, when necessary, by formation of an overcoat layer of, for example, polyimide, polyamide, $SiO_2$, or $Al_2O_3$. Subsequently, orientation is effected, a seal material is printed thereon, arrangement is made so that the electrode planes face each other, the periphery is sealed, and the seal material is allowed to harden to form an empty cell.

A composition containing the compound of the invention is injected into the empty cell, and the injection inlet is sealed with a sealing agent to form a liquid crystal cell. Where necessary, a polarizing plate, a color polarizing plate, a light source, a color filter, a semitransparent reflecting plate, a reflecting plate, a light guide plate, an ultraviolet light filter, and the like may be layered on the liquid crystal cell; characters, figures, and the like may be printed on the liquid crystal cell; and non-glare treatment may be applied to the liquid crystal cell, among other processings, to produce a liquid crystal electric optical device.

The above description is made to explain the basic configuration of the liquid crystal device and the method of producing the same, and any other configuration as appropriate may be used. Examples of other configurations that may be used include substrates using dual-layer electrodes, a dual liquid crystal cell formed with a dual-layer liquid crystal layer, substrates using reflecting electrodes, and an active matrix device using active matrix substrates formed with active devices such as TFT and MIM. The composition of the invention is also suitably used to form an active matrix device such as TFT and MIM.

Besides the TN type, the composition of the invention may also be used in various other modes of devices including a liquid crystal device of large twist-angle super twisted nematic (STN) type, a liquid crystal device of guest-host (GH) type using a polychromatic pigment, a liquid crystal device of in-plane-switching (IPS) type driving the liquid crystal molecules parallel to the substrates with lateral electric fields, a liquid crystal device of VA type effecting vertical orientation of the liquid crystal molecules with respect to the substrates, and a high dielectric liquid crystal device. Further, the composition of the invention may also be used where writing is effected thermally in lieu of electrically.

EXAMPLES

The present invention is described below more specifically by way of examples. The examples given below are only illustrative of the present invention and are not to be construed to limit the invention in any manner. Unless otherwise described, "%" denotes "mass %."

To measure the physical property value of the liquid crystalline compound, two kinds of samples may be used: one using the compound itself as sample; the other using a mixture prepared by mixing the compound with a mother liquid crystal as sample.

When using the latter sample prepared by mixing the compound with a mother liquid crystal, measurement is carried out as follows. First, 20 mass % of a liquid crystalline compound obtained and 80 mass % of a mother liquid crystal are mixed to prepare a sample. Then, the measurements of the sample are used to calculate an extrapolated value by an extrapolation method represented by the equation given below. The extrapolated value is used as the physical property value.

extrapolated value=(100×(measurement of the sample)−(mass % of the mother liquid crystal)× (measurement of the mother liquid crystal)/(mass % of the liquid crystalline compound)

When the smectic phase or the crystal precipitates at 25° C. with the above content ratio of the liquid crystalline compound to the mother liquid crystal, the ratio of the liquid crystalline compound to the mother liquid crystal is varied as 10 mass %:90 mass %, 5 mass %:95 mass %, in this order until a composition wherein the smectic phase or the crystal does not precipitate at 25° C. is obtained, whereupon the physical property value of the sample is measured to obtain the extrapolated value according to the above formula, which extrapolated value is used as physical property value of the liquid crystalline compound.

The mother liquid crystal used for the measurement was a liquid crystal composition ZLI-1565 produced by Merck KGaA. The ZLI-1565 is a liquid crystal composition widely known as standard liquid crystal and estimated to contain six kinds of publicly known or widely known liquid crystal compounds and the like represented by the above formula. According to literature, the ZLI-1565 has following physical properties.

$T_{C \to N} < -40°$ C.
$T_{N \to I} = 85°$ C.
$\gamma 1 = 131.5$ mPa·s
$\Delta \varepsilon = +7.0$
$K_{33}/K_{11} = 1.27$ The liquid crystal composition used for the measurement may be prepared, for example, by mixing and shaking the compounds constituting the respective ingredients when the compounds are liquid, and by mixing the compounds, then heating and thereby melting them to liquids, followed by shaking when the compounds contain a solid.

The physical property values were measured by a method described later. Among the measurements, values obtained by measuring individual liquid crystalline compounds are listed as they are as experiment data. When a sample was obtained by mixing a compound with a mother liquid crystal, a value obtained by an extrapolation method is listed as extrapolated value.

Phase Structure and Transition Temperature (° C.)

Measurement was carried out by following methods (1) and (2).

(1) A sample was placed in the hot plate of a melting point measuring instrument equipped with a polarizing microscope (hot stage FP-82HT manufactured by Mettler-Toledo AG), and the phase state and its change were observed with the polarizing microscope as the sample was heated at a rate of 1° C./minute to determine the kind of the phase.

(2) A differential scanning calorimeter DSC-6220 manufactured by SII NanoTechnology Inc. was used to raise and lower the temperature at a rate of 1° C./minute and obtain the start point of an endothermic peak or exothermic peak accompanying the phase change of the sample (compound itself) by extrapolation (onset), thereby determining the transition temperature.

In the following, crystal is expressed as C. Smectic phase is expressed as Sm, and nematic phase is expressed as N. Liquid (isotropic) is expressed as I. The transition temperature described as, for example, "C 50.0 N 100.0 I" means that the transition temperature in the transition from crystal to nematic phase (CN) is 50.0° C. and the transition temperature in the transition from nematic phase to liquid crystal (NI) is 100.0° C. The same applies to other like expressions.

Clearing Point (Tc: ° C.)

A sample (a mixture of liquid crystal compound and a mother liquid crystal) was placed in the hot plate of a melting point measuring instrument equipped with a polarizing microscope (hot stage FP-82HT manufactured by Mettler-Toledo AG) and observed with the polarizing microscope as the sample was heated at a rate of 1° C./minute to determine the kind of the phase. The temperature at which a part of the sample changed from liquid phase to isotropic liquid was determined as clearing point.

Rotational Viscosity ($\gamma 1$; measured at 25° C.; mPa·s)

The measurement was carried out according to a method described by M. Imai et al. in Molecular Crystals and Liquid Crystals, Vol. 259, 37 (1995). A sample (a mixture of a liquid crystal compound and a mother liquid crystal compound) was inserted in a TN cell having a gap (cell gap) of 8 μm between two glass substrates. A voltage from 10 V to 90 V was incrementally applied to this device at a step of one volt. Application of voltage was repeated under a condition such that a 0.2-second application of no voltage was followed by application of a single square wave (square pulse, 0.2 seconds) and no voltage (2 seconds). The peak current and peak time of the transient current generated by such application were measured. The value of rotational viscosity was obtained from these measurements and the formula (8) described on page 40 of the above-mentioned literature by M. Imai et al. The dielectric anisotropy used for this calculation was a measurement obtained as referred to later herein in a description about the dielectric anisotropy.

Optical Anisotropy (refractive index anisotropy Δn measured at 25° C.)

The measurement was implemented at 25° C. using light having a wavelength of 589 nm and an Abbe's refractometer having an eyepiece equipped with a polarizing plate. After rubbing the surface of the main prism in one direction, a sample (a mixture of a liquid crystal compound and a mother liquid crystal) was dropped onto the main prism. The refractive index (n∥) was measured when the polarizing direction was parallel to the rubbing direction. The refractive index (n⊥) was measured when the polarizing direction was normal to the rubbing direction. The value of optical anisotropy (Δn) was calculated from an equation Δn=n∥−n⊥.

Elastic constants ($K_{11}$, $K_{33}$ measured at 25° C.; pN)

Measurement was implemented by a method of measuring the applied voltage dependence of the static capacitance of the liquid cell (static capacitance method). Sufficiently washed glass substrates were each provided with an oriented film of polyimide. The oriented films provided on the glass substrates underwent rubbing treatment, and a liquid crystal was filled in the cell. The static capacitance of the liquid crystal was measured as the applied voltage was varied. The dielectric anisotropy measured by the above method was used to calculate $K_{11}$ from Freedericksz transition point and $K_{33}$ from this value from the curve fitting for the capacitance change.

Example 1

A compound (1a-1-1) was synthesized from a compound (2a-1).

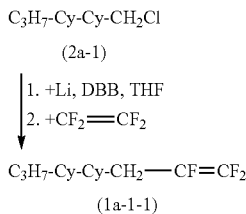

Synthesis of compound (1a-1-1)

An argon-substituted 1-L four-neck flask was added with 3.3 g of metal lithium, 12.5 g of 4,4'-di-tert-butyl biphenyl, and 400 mL of THF and agitated at room temperature. After an elapse of 2 hours, the reaction liquid was cooled to −10° C. and added with a 40-mL THF solution containing 40 g of the compound (2a-1) that was synthesized by a known method, followed by 2 hours of agitation. Then, upon cooling to −70° C., 11.0 L of 60% tetrafluoroethylene/nitrogen gas was introduced to the reaction liquid, followed by one hour of agitation. The reaction liquid was gradually heated to 0° C. and added with a 300-mL 7.2% aqueous solution of hydrochloric acid to effect extraction with 200 mL of hexane. The hexane solution was washed with 100 mL of water, 100 mL of sodium bicarbonate water, and 100 mL of water in this order, whereupon the solvent was removed by distillation. The residue was purified by silica gel column chromatography to obtain 30.4 g of a compound (1a-1-1) (yield 57%).

$^1$H-NMR (300 MHz, CDCl$_3$) 0.84-1.80 (m, 19H), 1.71-1.80 (m, 8H), 2.06-2.19 (m, 2H)

$^{19}$F-NMR (283 MHz, CFCl$_3$)−106.31 (dd, J=33.63 Hz, 91.58 Hz, 1F), −125.49 (dd, J=91.58 Hz, 112.78 Hz, 1F), −172.26 (ddt, J=24.31 Hz, 30.53 Hz, 112.78 Hz, 1F)

Example 2

A compound (1b-1-1) was synthesized from a compound (1a-1-1).

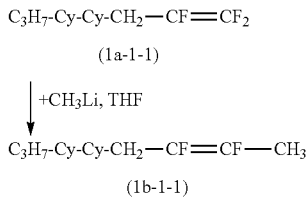

Synthesis of Compound (1b-1-1)

An argon-substituted 300-mL four-neck flask was added with a 50-mL THF solution containing 10.9 g of the compound (1a-1-1) and cooled to −10° C. Then, a 60-mL 1.8-M methyl lithium solution was added, and one hour of agitation was carried out at the same temperature, followed by gradually heating to room temperature. The reaction liquid was added with a 70-mL 7.2% aqueous solution of hydrochloric acid to effect extraction with 40 mL of hexane. The hexane solution was washed with 20 mL of water, 20 mL of sodium bicarbonate water, and 20 mL of water in this order, whereupon the solvent was removed by distillation. The residue was purified by silica gel column chromatography to obtain 6.9 g of a compound (1b-1-1) (yield 65%).

$^1$H-NMR (300 MHz, CDCl$_3$) 0.81-1.75 (m, 28H), 1.93-2.00 (m, 2H), 2.13-2.25 (m, 2H)

$^{19}$F-NMR (283 MHz, CFCl$_3$) −148.41 (J=140.37 Hz, 1F), −153.35 (J=128.20 Hz, 1F)

Example 3

A compound (1a-2-1) was synthesized from a compound (2a-2).

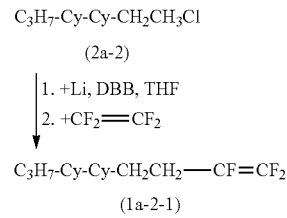

Synthesis of Compound (1a-2-1)

In lieu of 40 g of the compound (2a-1) used in Example 1, 40 g of the compound (2a-2) was used, and reaction was allowed to take place as in Example 1 to obtain 38.0 g of a compound (1a-2-1) (yield 78%).

$^1$H-NMR (300 MHz, CDCl$_3$) 0.84-1.39 (m, 21H), 1.54-1.76 (m, 8H), 2.30-2.38 (m, 2H)

$^{19}$F-NMR (283 MHz, CFCl$_3$) −106.75 (J=92.82 Hz, 1F), −125.83 (J=113.20 Hz, 1F), −174.84 (J=113.20 Hz, 1F)

Example 4

A compound (1b-2-1) was synthesized from a compound (1a-2-1).

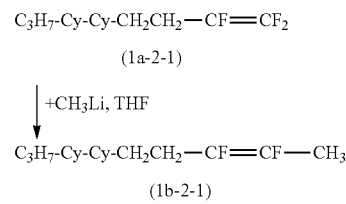

Synthesis of Compound (1b-2-1)

In lieu of 10.9 g of the compound (1a-1-1) used in Example 1, 11.5 g of the compound (1a-2-1) was used, and reaction was allowed to take place as in Example 2 to obtain 8.2 g of a compound (1b-2-1) (yield 74%).

$^1$H-NMR (300 MHz, CDCl$_3$) 0.84-1.79 (m, 28H), 1.91-1.99 (m, 2H), 2.30-2.38 (m, 2H)

$^{19}$F-NMR (283 MHz, CFCl$_3$) −149.15 (J=140.37 Hz, 1F), −156.10 (J=119.14 Hz, 1F)

Example 5

A compound (1b-0-1) was synthesized from a compound (7).

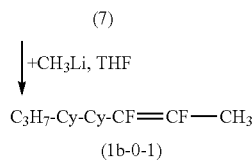

Synthesis of Compound (1b-0-1)

In lieu of 10.9 g of the compound (1a-1-1) used in Example 1, 10.4 g of the compound 7 was used, and reaction was allowed to take place as in Example 2 to obtain 6.9 g of a compound (1b-0-1) (yield 68%).

$^1$H-NMR (300 MHz, CDCl$_3$) 0.82-1.79 (m, 26H), 1.90-2.02 (m, 3H), 2.40-2.61 (m, 1H)

$^{19}$F-NMR (283 MHz, CFCl$_3$) −150.05 (J=119.04 Hz, 1F), −165.57 (J=121.97 Hz, 1F)

Example 6

The compounds shown in Tables 1 to 7 may be synthesized by methods similar to those described in Examples 1 to 5. These compounds listed therein also include the compounds obtained in Examples 1 to 5. The data given therein are measurements obtained by the above methods. The transition temperatures are measurements obtained by measuring the compounds; the clearing points (Tc) and refractive index anisotropy values (Δn) are extrapolated values obtained through conversion of the measurements of the samples obtained by mixing the compounds with the mother liquid crystal ZLI-1565 according to the above extrapolation method.

In Tables 1 to 7, "B" denotes "-(A$^1$-Z$^1$)a-(A$^2$-Z$^2$)b-(A$^3$-Z$^3$)c-" in the compound (1). In Tables 1 to 7, Cy denotes a 1,4-cyclohexylene group; Ph denotes a 1,4-phenylene group.

TABLE 1

| R$^1$ | B | -A$^4$- | n | R$^2$ | | |
|---|---|---|---|---|---|---|
| CH$_3$ | Cy | Cy | 0 | C$_3$H$_7$ | | |
| CH$_3$ | Cy | Cy | 0 | C$_5$H$_{11}$ | | |
| C$_2$H$_5$ | Cy | Cy | 0 | C$_3$H$_7$ | | |
| C$_2$H$_5$ | Cy | Cy | 0 | C$_5$H$_{11}$ | | |
| C$_3$H$_7$ | Cy | Cy | 0 | CH$_3$ | C 69.1 I<br>Tc 40.2° C.<br>Δn 0.0503 | (1b-0-1) |
| C$_3$H$_7$ | Cy | Cy | 0 | C$_2$H$_5$ | C 44.0 Sm 78.8 I<br>Tc 47.9° C.<br>Δn 0.0453 | (1b-0-2) |
| C$_3$H$_7$ | Cy | Cy | 0 | C$_3$H$_7$ | C 22.8 Sm 91.5 I<br>Tc 53.9° C.<br>Δn 0.0483 | (1b-0-3) |
| C$_3$H$_7$ | Cy | Cy | 0 | C$_5$H$_{11}$ | | |
| C$_4$H$_9$ | Cy | Cy | 0 | C$_3$H$_7$ | | |
| C$_4$H$_9$ | Cy | Cy | 0 | C$_5$H$_{11}$ | | |
| C$_5$H$_{11}$ | Cy | Cy | 0 | CH$_3$ | | |
| C$_5$H$_{11}$ | Cy | Cy | 0 | C$_2$H$_5$ | | |
| C$_5$H$_{11}$ | Cy | Cy | 0 | C$_3$H$_7$ | | |
| C$_5$H$_{11}$ | Cy | Cy | 0 | C$_5$H$_{11}$ | | |
| C$_7$H$_{15}$ | Cy | Cy | 0 | CH$_3$ | | |
| CH$_3$ | Cy | Cy | 1 | C$_5$H$_{11}$ | | |
| CH$_3$ | Cy | Cy | 1 | F | C −26.6 Sm 56.9 I | (1a-1-1) |
| C$_3$H$_7$ | Cy | Cy | 1 | CH$_3$ | C 42.0 Sm 62.5 I | (1b-1-1) |
| C$_3$H$_7$ | Cy | Cy | 1 | C$_2$H$_5$ | C <−70 Sm 36.9 I | (1b-1-2) |
| C$_3$H$_7$ | Cy | Cy | 1 | C$_3$H$_7$ | | |
| C$_3$H$_7$ | Cy | Cy | 1 | C$_5$H$_{11}$ | | |

TABLE 2

| R$^1$ | B | -A$^4$- | n | R$^2$ | | |
|---|---|---|---|---|---|---|
| C$_3$H$_7$ | Cy | Cy | 1 | F | | |
| C$_5$H$_{11}$ | Cy | Cy | 1 | C$_3$H$_7$ | | |
| C$_5$H$_{11}$ | Cy | Cy | 1 | C$_5$H$_{11}$ | | |
| C$_7$H$_{15}$ | Cy | Cy | 1 | F | | |
| C$_7$H$_{15}$ | Cy | Cy | 1 | CH$_3$ | | |
| CH$_3$ | Cy | Cy | 2 | F | | |
| CH$_3$ | Cy | Cy | 2 | C$_5$H$_{11}$ | | |
| C$_3$H$_7$ | Cy | Cy | 2 | F | C 7.4 Sm 53.9 I<br>Tc 39.9° C.<br>Δn 0.0308 | (1a-2-1) |
| C$_3$H$_7$ | Cy | Cy | 2 | CH$_3$ | C 47.6 Sm 76.7 I<br>Tc 50.1° C.<br>Δn 0.0472 | (1b-2-1) |
| C$_3$H$_7$ | Cy | Cy | 2 | C$_2$H$_5$ | | |
| C$_3$H$_7$ | Cy | Cy | 2 | C$_3$H$_7$ | | |
| C$_3$H$_7$ | Cy | Cy | 2 | C$_5$H$_{11}$ | | |
| CH$_3$ | Cy | Cy | 3 | F | | |
| CH$_3$ | Cy | Cy | 3 | C$_5$H$_{11}$ | | |
| C$_3$H$_7$ | Cy | Cy | 3 | F | C −33.2 Sm 86.5 I<br>Δn 0.0190 | (1a-3-1) |
| C$_3$H$_7$ | Cy | Cy | 3 | CH$_3$ | | |
| C$_3$H$_7$ | Cy | Cy | 3 | C$_2$H$_5$ | | |
| C$_3$H$_7$ | Cy | Cy | 3 | C$_3$H$_7$ | | |
| C$_3$H$_7$ | Cy | Cy | 3 | C$_5$H$_{11}$ | | |

TABLE 3

| R$^1$ | B | -A$^4$- | n | R$^2$ | | |
|---|---|---|---|---|---|---|
| C$_3$H$_7$ | Cy | Ph | 1 | F | C 0.0 I | (1c-1-1) |
| C$_3$H$_7$ | Cy | Ph | 1 | CH$_3$ | | |
| C$_3$H$_7$ | Cy | Ph | 1 | C$_3$H$_7$ | | |
| C$_3$H$_7$ | Cy | Ph | 1 | C$_5$H$_{11}$ | | |
| C$_5$H$_{11}$ | Cy | Ph | 1 | F | | |
| C$_5$H$_{11}$ | Cy | Ph | 1 | CH$_3$ | | |
| C$_5$H$_{11}$ | Cy | Ph | 1 | C$_3$H$_7$ | | |
| C$_5$H$_{11}$ | Cy | Ph | 1 | C$_5$H$_{11}$ | | |
| C$_3$H$_7$ | Cy | Ph | 2 | F | C 18.7 I<br>Δn 0.0320 | (1c-2-1) |
| C$_3$H$_7$ | Cy | Ph | 2 | CH$_3$ | C 46.9 I<br>Δn 0.0574 | (1d-2-1) |
| C$_3$H$_7$ | Cy | Ph | 2 | C$_2$H$_5$ | | |
| C$_3$H$_7$ | Cy | Ph | 2 | C$_3$H$_7$ | | |
| C$_3$H$_7$ | Cy | Ph | 2 | C$_5$H$_{11}$ | | |
| C$_5$H$_{11}$ | Cy | Ph | 2 | F | | |
| C$_5$H$_{11}$ | Cy | Ph | 2 | C$_3$H$_7$ | | |
| C$_5$H$_{11}$ | Cy | Ph | 2 | C$_5$H$_{11}$ | | |
| C$_3$H$_7$ | Cy | Ph | 3 | F | | |
| C$_3$H$_7$ | Cy | Ph | 3 | CH$_3$ | | |
| C$_3$H$_7$ | Cy | Ph | 3 | C$_2$H$_5$ | C −7.0 I | (1d-3-1) |

TABLE 4

| R$^1$ | B | -A$^4$- | n | R$^2$ | | |
|---|---|---|---|---|---|---|
| C$_3$H$_7$ | Ph | Cy | 0 | CH$_3$ | C 41.4 I<br>Δn 0.0340 | (1b-0-4) |
| C$_3$H$_7$ | Ph | Cy | 0 | C$_2$H$_5$ | C 28.4 I<br>Δn 0.0280 | (1b-0-5) |
| C$_3$H$_7$ | Ph | Cy | 0 | C$_3$H$_7$ | C 25.9 I<br>Δn 0.0330 | (1b-0-6) |
| C$_3$H$_7$ | Ph | Cy | 0 | C$_5$H$_{11}$ | | |
| C$_5$H$_{11}$ | Ph | Cy | 0 | F | | |
| C$_5$H$_{11}$ | Ph | Cy | 0 | C$_3$H$_7$ | | |

TABLE 4-continued

| $R^1$ | B | $-A^4-$ | n | $R^2$ |
|---|---|---|---|---|
| $C_5H_{11}$ | Ph | Cy | 0 | $C_5H_{11}$ |
| $C_3H_7$ | Ph | Cy | 1 | F |
| $C_3H_7$ | Ph | Cy | 1 | $CH_3$ |
| $C_3H_7$ | Ph | Cy | 1 | $C_3H_7$ |
| $C_3H_7$ | Ph | Cy | 1 | $C_5H_{11}$ |
| $C_5H_{11}$ | Ph | Cy | 1 | F |
| $C_5H_{11}$ | Ph | Cy | 1 | $C_3H_7$ |
| $C_5H_{11}$ | Ph | Cy | 1 | $C_5H_{11}$ |
| $C_3H_7$ | Ph | Cy | 2 | F |
| $C_3H_7$ | Ph | Cy | 2 | $CH_3$ |
| $C_3H_7$ | Ph | Cy | 2 | $C_3H_7$ |
| $C_3H_7$ | Ph | Cy | 2 | $C_5H_{11}$ |
| $C_5H_{11}$ | Ph | Cy | 2 | F |
| $C_5H_{11}$ | Ph | Cy | 2 | $C_3H_7$ |
| $C_5H_{11}$ | Ph | Cy | 2 | $C_5H_{11}$ |
| $C_3H_7$ | Ph | Cy | 3 | F |
| $C_3H_7$ | Ph | Cy | 3 | $CH_3$ |
| $C_3H_7$ | Ph | Cy | 3 | $C_2H_5$ |

TABLE 5

| $R^1$ | B | $-A^4-$ | n | $R^2$ | | |
|---|---|---|---|---|---|---|
| $C_3H_7$ | Ph | Ph | 1 | F | | |
| $C_3H_7$ | Ph | Ph | 1 | $CH_3$ | | |
| $C_3H_7$ | Ph | Ph | 1 | $C_3H_7$ | | |
| $C_3H_7$ | Ph | Ph | 1 | $C_5H_{11}$ | | |
| $C_5H_{11}$ | Ph | Ph | 1 | F | | |
| $C_5H_{11}$ | Ph | Ph | 1 | $C_3H_7$ | | |
| $C_5H_{11}$ | Ph | Ph | 1 | $C_5H_{11}$ | | |
| $CH_3$ | Ph | Ph | 2 | F | C 61.9 Sm (59.2) I $\Delta$n 0.1191 | (1c-2-2) |
| $CH_3$ | Ph | Ph | 2 | $CH_3$ | | |
| $C_3H_7$ | Ph | Ph | 2 | F | | |
| $C_3H_7$ | Ph | Ph | 2 | $CH_3$ | | |
| $C_3H_7$ | Ph | Ph | 2 | $C_3H_7$ | | |
| $C_3H_7$ | Ph | Ph | 2 | $C_5H_{11}$ | | |
| $C_5H_{11}$ | Ph | Ph | 2 | F | | |
| $C_5H_{11}$ | Ph | Ph | 2 | $C_3H_7$ | | |
| $C_5H_{11}$ | Ph | Ph | 2 | $C_5H_{11}$ | | |
| $C_3H_7$ | Ph | Ph | 3 | F | | |
| $C_3H_7$ | Ph | Ph | 3 | $CH_3$ | | |
| $C_3H_7$ | Ph | Ph | 3 | $C_2H_5$ | | |

TABLE 6

| $R^1$ | B | $-A^4-$ | n | $R^2$ |
|---|---|---|---|---|
| $C_3H_7$ | Cy-Cy | Ph | 1 | F |
| $C_3H_7$ | Cy-Cy | Ph | 1 | $CH_3$ |
| $C_3H_7$ | Cy-Cy | Ph | 1 | $C_3H_7$ |
| $C_3H_7$ | Cy-Cy | Ph | 1 | $C_5H_{11}$ |
| $C_5H_{11}$ | Cy-Cy | Ph | 1 | F |
| $C_5H_{11}$ | Cy-Cy | Ph | 1 | $C_3H_7$ |
| $C_5H_{11}$ | Cy-Cy | Ph | 1 | $C_5H_{11}$ |
| $CH_3$ | Cy-Cy | Ph | 2 | F |
| $CH_3$ | Cy-Cy | Ph | 2 | $CH_3$ |
| $C_3H_7$ | Cy-Cy | Ph | 2 | F |
| $C_3H_7$ | Cy-Cy | Ph | 2 | $CH_3$ |
| $C_3H_7$ | Cy-Cy | Ph | 2 | $C_3H_7$ |
| $C_3H_7$ | Cy-Cy | Ph | 2 | $C_5H_{11}$ |
| $C_5H_{11}$ | Cy-Cy | Ph | 2 | F |
| $C_5H_{11}$ | Cy-Cy | Ph | 2 | $C_3H_7$ |
| $C_5H_{11}$ | Cy-Cy | Ph | 2 | $C_5H_{11}$ |
| $C_3H_7$ | Cy-Cy | Ph | 3 | F |
| $C_3H_7$ | Cy-Cy | Ph | 3 | $CH_3$ |
| $C_3H_7$ | Cy-Cy | Ph | 3 | $C_2H_5$ |

TABLE 7

| $R^1$ | B | $-A^4-$ | n | $R^2$ |
|---|---|---|---|---|
| $C_3H_7$ | Cy-Ph | Cy | 1 | F |
| $C_3H_7$ | Cy-Ph | Cy | 1 | $CH_3$ |
| $C_3H_7$ | Cy-Ph | Cy | 1 | $C_3H_7$ |
| $C_3H_7$ | Cy-Ph | Cy | 1 | $C_5H_{11}$ |
| $C_5H_{11}$ | Cy-Ph | Cy | 1 | F |
| $C_5H_{11}$ | Cy-Ph | Cy | 1 | $C_3H_7$ |
| $C_5H_{11}$ | Cy-Ph | Cy | 1 | $C_5H_{11}$ |
| $CH_3$ | Cy-Ph | Cy | 2 | F |
| $CH_3$ | Cy-Ph | Cy | 2 | $CH_3$ |
| $C_3H_7$ | Cy-Ph | Cy | 2 | F |
| $C_3H_7$ | Cy-Ph | Cy | 2 | $CH_3$ |
| $C_3H_7$ | Cy-Ph | Cy | 2 | $C_3H_7$ |
| $C_3H_7$ | Cy-Ph | Cy | 2 | $C_5H_{11}$ |
| $C_5H_{11}$ | Cy-Ph | Cy | 2 | F |
| $C_5H_{11}$ | Cy-Ph | Cy | 2 | $C_3H_7$ |
| $C_5H_{11}$ | Cy-Ph | Cy | 2 | $C_5H_{11}$ |
| $C_3H_7$ | Cy-Ph | Cy | 3 | F |
| $C_3H_7$ | Cy-Ph | Cy | 3 | $CH_3$ |
| $C_3H_7$ | Cy-Ph | Cy | 3 | $C_2H_5$ |

Example 7

A liquid crystal composition was prepared by mixing 90 mol % (89 mass %) of "ZLI-1565," the liquid crystal composition produced by Merck KGaA, and 10 mol % (11 mass %) of the compound (1a-1-1) of the invention in this ratio. This liquid crystal composition will be referred to as liquid crystal composition A below.

Example 8

A liquid crystal composition was prepared by mixing 90 mol % (89 mass %) of "ZLI-1565," the liquid crystal composition produced by Merck KGaA, and 10 mol % (11 mass %) of the compound (1a-2-1) of the invention in this ratio. This liquid crystal composition will be referred to as liquid crystal composition B below.

Example 9

A liquid crystal composition was prepared by mixing 90 mol % (89 mass %) of "ZLI-1565," the liquid crystal composition produced by Merck KGaA, and 10 mol % (11 mass %) of the compound (1b-2-1) of the invention in this ratio. This liquid crystal composition will be referred to as liquid crystal composition C below.

Example 10

A liquid crystal composition was prepared by mixing 90 mol % (90 mass %) of "ZLI-1565," the liquid crystal composition produced by Merck KGaA, and 10 mol % (10 mass %) of the compound (1c-2-1) of the invention in this ratio. This liquid crystal composition will be referred to as liquid crystal composition D below.

Comparative Example 1

The "ZLI-1565," the liquid crystal composition produced by Merck KGaA, alone will be referred to as liquid crystal composition E below.

The rotational viscosities (also referred to as "γ1" below) of the liquid crystal compositions A to E thus obtained were measured by the above method. Table 8 shows the measurements of the rotational viscosities obtained by measuring them in the compositions.

TABLE 8

| | | γ1(mPa·s)(20° C.) |
|---|---|---|
| Example 7 | Liquid crystal composition A | 109.1 |
| Example 8 | Liquid crystal composition B | 114.7 |
| Example 9 | Liquid crystal composition C | 119.1 |
| Example 10 | Liquid crystal composition D | 90.9 |
| Comparative Example 1 | Liquid crystal composition E | 131.5 |

We found, as clearly shown by the results given in Table 8, that the liquid crystal compositions of the invention containing the compounds (1a-1-1), (1a-2-1), (1b-2-1), and (1c-2-1) described in Examples 7 to 10 have a lower rotational viscosity (γ1) than the liquid crystal composition "ZLI-1565" produced by Merck KGaA used as Comparative Example 1.

Example 11

A liquid crystal composition was prepared by mixing 90 mol % (89 mass %) of "ZLI-1565," the liquid crystal composition produced by Merck KGaA, and 10 mol % (11 mass %) of the compound (1b-1-2) of the invention in this ratio. This liquid crystal composition will be referred to as liquid crystal composition F below.

Example 12

A liquid crystal composition was prepared by mixing 90 mol % (89 mass %) of "ZLI-1565," the liquid crystal composition produced by Merck KGaA, and 10 mol % (11 mass %) of the compound (1b-0-2) of the invention in this ratio. This liquid crystal composition will be referred to as liquid crystal composition G below.

Example 13

A liquid crystal composition was prepared by mixing 90 mol % (89 mass %) of "ZLI-1565," the liquid crystal composition produced by Merck KGaA, and 10 mol % (11 mass %) of the compound (1a-2-1) of the invention in this ratio. This liquid crystal composition will be referred to as liquid crystal composition H below.

Example 14

A liquid crystal composition was prepared by mixing 90 mol % (89 mass %) of "ZLI-1565," the liquid crystal composition produced by Merck KGaA, and 10 mol % (11 mass %) of the compound (1b-0-3) of the invention in this ratio. This liquid crystal composition will be referred to as liquid crystal composition I below.

Comparative Example 2

The "ZLI-1565," the liquid crystal composition produced by Merck KGaA, alone will be referred to as liquid crystal composition J below.

The elastic constants (also referred to as "$K_{11}$ and $K_{33}$" below) of the liquid crystal compositions F to J thus obtained were measured by the above method. Table 9 shows the measurements of the rotational viscosities obtained by measuring them in the compositions. Elastic constant ratios $K_{33}/K_{11}$ are also shown in Table 9.

TABLE 9

| | (25° C.) | $K_{11}$ | $K_{33}$ | $K_{33}/K_{11}$ |
|---|---|---|---|---|
| Example 11 | Liquid crystal composition F | 10.1 | 13.3 | 1.32 |
| Example 12 | Liquid crystal composition G | 11.9 | 16.3 | 1.36 |
| Example 13 | Liquid crystal composition H | 11.3 | 15.9 | 1.40 |
| Example 14 | Liquid crystal composition I | 12.1 | 17.7 | 1.46 |
| Comparative Example 2 | Liquid crystal composition J | 12.8 | 17.7 | 1.38 |

We found, as clearly shown by the results given in Table 9, that the liquid crystal composition of the invention comprising the compounds (1b-1-2), (1b-0-2), (1a-2-1) and (1b-0-3) described in Examples 11 to 14 has a smaller elastic constant than the liquid crystal composition "ZLI-1565" produced by Merck KGaA used as Comparative Example 2. Smaller $K_{11}$ and $K_{33}$ are advantageous in that the threshold voltage in the TN mode, VA mode, OCB mode, and the like then decreases. Examples 13 and 14, where the elastic constant ratio $K_{33}/K_{11}$ is greater than in the comparative examples, are suitable for the STN mode. Examples 11 and 12, where the elastic constant ratio $K_{33}/K_{11}$ is smaller than in the comparative examples, are suitable for the TN mode. It follows from the above that the compound of the invention, when contained in a liquid crystal composition, may be suitably used in various modes of liquid crystal display devices.

Example 15

Table 10 shows the phase sequence, liquid crystal temperature range (calculated from the phase sequence), and clearing point (Tc) of the compound (1a-2-1) and the compound (1b-2-1) of the invention.

Comparative Example 3

Table 10 shows the phase sequence, clearing point (Tc), and liquid crystal temperature range, obtained by measurement and calculation under the same conditions as in Example 6, of the compound (7) used as a synthesis material of the compound (1b-0-1) in Example 5. Note that the compound (7) (2-[trans-4-(trans-4-propyl cyclohexyl)cyclohexyl]-1,1,2-trifluoroethylene)) is described as compound (2) in Patent Document 3.

TABLE 10

| | Phase sequence | Liquid crystal temperature | Tc |
|---|---|---|---|
| Compound (1a-2-1) | C 7.4 Sm 53.9 I | 46.5° C. | 39.9° C. |
| Compound (1b-2-1) | C 47.9 Sm 76.7 I | 29.1° C. | 50.1° C. |
| Compound (7) | C 7.6 N 33.5 I | 25.9° C. | 26.5° C. |

As is clear from the above, the compound of the invention enables preparation of a composition having both a low rotational viscosity (γ1) and appropriate elastic constants ($K_{11}$ and $K_{33}$). Because the compound with n=2, in particular, has a higher Tc and a wider liquid crystal temperature range than the compound (7) having a similar structure, it is deemed that the compound of the invention enables preparation of a composition having a wide operating temperature range.

We claim:
1. A liquid crystal compound represented by formula (1)

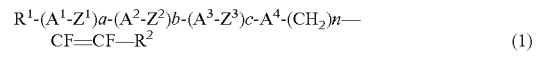

(1)

wherein $R^1$ is a hydrogen atom, or an alkyl group having 1 to 10 carbons, $R^2$ is a halogen atom or an alkyl group having 1 to 10 carbons, at least one hydrogen atom in the alkyl group in $R^1$ and $R^2$ is optionally substituted with a halogen atom, and an ethereal oxygen atom or a thioethereal sulfur atom is optionally inserted between carbon-carbon atoms in the alkyl group or at a bond end of the alkyl group, $A^1$, $A^2$, $A^3$ and $A^4$ independently represent a phenylene group or a cyclohexylene group, wherein one or two —CH= in the groups of $A^1$, $A^2$, $A^3$ and $A^4$ is optionally substituted with a nitrogen atom; and one or two —CH$_2$— in these groups is optionally substituted with an ethereal oxygen atom or an thioethereal sulfur atom, $Z^1$, $Z^2$ and $Z^3$ independently represent a single bond, —O—, —S—, or a divalent aliphatic hydrocarbon group having 1 to 4 carbons, wherein at least one hydrogen atom in the aliphatic hydrocarbon group is optionally substituted with a halogen atom, and an ethereal oxygen atom or a thioethereal sulfur atom is optionally inserted between carbon-carbon atoms in the aliphatic hydrocarbon group or at a bond end of the aliphatic hydrocarbon group, a, b, c independently represent 0 or 1, wherein a+b+c is 1 or greater, n is 0 or 2, wherein when $A^4$ is a phenylene group, n is 2, and when $A^4$ is a cyclohexylene group and n=0, $R^2$ is an alkyl group having 1 to 10 carbons.

2. The compound of claim 1, wherein $R^1$ is an alkyl group, an alkoxy group, a fluoroalkyl group or a fluoroalkoxy group having 1 to 5 atoms, and $R^2$ is a fluorine atom or an alkyl group having 1 to 5 atoms.

3. The compound of claim 1, wherein $A^1$, $A^2$, $A^3$ and $A^4$ independently represent a 1,4-cyclohexylene group or a 1,4-phenylene group.

4. The compound of claim 1, wherein n is 2, and $R^2$ is a fluorine atom or an alkyl group having 1 to 5 carbons.

5. The compound of claim 1, wherein a+b+c is 2 or less.

6. A liquid crystal composition, comprising the compound of claim 1.

7. A liquid crystal device, comprising the composition of claim 6 held between at least two substrates, wherein each substrate is provided with at least one electrode.

* * * * *